United States Patent
Zhao et al.

(10) Patent No.: US 11,110,437 B2
(45) Date of Patent: Sep. 7, 2021

(54) SCR CATALYST AND ITS PREPARATION METHOD AND APPLICATIONS

(71) Applicants: BAOTOU RESEARCH INSTITUTE OF RARE EARTHS, Baotou (CN); NATIONAL ENGINEERING RESEARCH CENTRE OF RUIKE RARE EARTH METALLURGY AND FUNCTION MATERIALS CO., LTD., Baotou (CN); HEBEI HWAT AUTOMOBILE COMPONENTS CO., LTD., Hengshui (CN)

(72) Inventors: Wenyi Zhao, Baotou (CN); Yan Wang, Baotou (CN); Zhaoqiang Li, Baotou (CN); Cheng Zhang, Baotou (CN); Rongrong Fan, Baotou (CN); Xin Guo, Baotou (CN); Yu Wang, Baotou (CN); Rong Wang, Baotou (CN); Lihua Song, Baotou (CN); Yanhai Song, Baotou (CN); Yuan Li, Baotou (CN); Zhiyong Ding, Baotou (CN); Jing Song, Baotou (CN)

(73) Assignees: BAOTOU RESEARCH INSTITUTE OF RARE EARTHS, Baotou (CN); NATIONAL ENGINEERING RESEARCH CENTRE OF RUIKE RARE EARTH METALLURGY AND FUNCTION MATERIALS CO., LTD., Baotou (CN); HEBEI HWAT AUTOMOBILE COMPONENTS CO., LTD., Hengshui (CN)

( * ) Notice: Subject to any disclaimer, the term of this patent is extended or adjusted under 35 U.S.C. 154(b) by 96 days.

(21) Appl. No.: 16/514,422

(22) Filed: Jul. 17, 2019

(65) Prior Publication Data
US 2020/0038845 A1     Feb. 6, 2020

(30) Foreign Application Priority Data

Jul. 31, 2018   (CN) .......................... 201810856147.9

(51) Int. Cl.
*B01J 23/30*   (2006.01)
*B01J 23/83*   (2006.01)
(Continued)

(52) U.S. Cl.
CPC .......... *B01J 23/83* (2013.01); *B01D 53/9418* (2013.01); *B01J 23/30* (2013.01); *B01J 35/0013* (2013.01);
(Continued)

(58) Field of Classification Search
CPC . B01J 23/30; B01J 23/83; B01J 37/009; B01J 37/04; B01J 37/06; B01J 37/088; B01J 37/10; B01J 37/342; B01J 35/0013
See application file for complete search history.

(56) References Cited

U.S. PATENT DOCUMENTS 7,491,676 B2 * 2/2009 Augustine .......... B01D 53/8628
                                                                502/302
7,628,968 B2 * 12/2009 Augustine .......... B01D 53/8628
                                                                423/239.1
(Continued)

FOREIGN PATENT DOCUMENTS

| CN | 105032446 A | 11/2015 |
| CN | 105562077 A | 5/2016 |
| CN | 106574536 A | 4/2017 |

*Primary Examiner* — Cam N. Nguyen
(74) *Attorney, Agent, or Firm* — Osha Bergman Watanabe & Burton LLP

(57) ABSTRACT

A method for preparing an SCR catalyst may include: (1) placing a first aqueous solution containing a titanium oxide and a tungstate in an electric field environment, adjusting the pH value of the first aqueous solution, and adjusting the current direction of the electric field environment to obtain (Continued)

a first mixture; (2) providing a second mixture by, in the electric field environment, adding dropwise a second aqueous solution containing a soluble salt of one or more active components, a copper-organic polyamine complex and a dispersant to the first mixture, and adjusting the current direction; and (3) processing the second mixture to obtain the SCR catalyst. The one or more active components may be selected from Ce, Zr, Cu, Fe, Pr and Sc.

8 Claims, 2 Drawing Sheets

(51) Int. Cl.
| | |
|---|---|
| *B01J 37/00* | (2006.01) |
| *B01J 37/04* | (2006.01) |
| *B01J 37/06* | (2006.01) |
| *B01J 37/08* | (2006.01) |
| *B01J 37/10* | (2006.01) |
| *B01J 37/34* | (2006.01) |
| *B01J 35/00* | (2006.01) |
| *B01D 53/94* | (2006.01) |

(52) U.S. Cl.
CPC ............ *B01J 37/009* (2013.01); *B01J 37/04* (2013.01); *B01J 37/06* (2013.01); *B01J 37/088* (2013.01); *B01J 37/10* (2013.01); *B01J 37/342* (2013.01); *B01D 2255/2065* (2013.01); *B01D 2255/20707* (2013.01); *B01D 2255/20715* (2013.01); *B01D 2255/20761* (2013.01); *B01D 2255/20776* (2013.01)

(56) References Cited

U.S. PATENT DOCUMENTS 8,247,343 B2 * 8/2012 Chapman ............. C01G 23/047
502/164
8,617,502 B2 * 12/2013 Augustine ............ B01J 37/0215
423/239.1

* cited by examiner

SCR CATALYST AND ITS PREPARATION METHOD AND APPLICATIONS

TECHNICAL FIELD OF THE DISCLOSURE

This disclosure relates to an SCR catalyst and its preparation method and applications, in particular to an SCR catalyst capable of removing nitrogen oxides from a vehicle exhaust gas, and a preparation method and applications thereof.

BACKGROUND OF THE DISCLOSURE

The content of nitrogen oxides being present in vehicle exhaust is very high, aggravating the air pollution. Therefore, the urgency of prevention and control of nitrogen oxides (NOx) in vehicle exhaust is becoming increasingly prominent. Selective catalytic reduction (SCR) can be used to prevent and control of NOx, which refers to the "selective" reaction of NOx in flue gas with reductants (such as $NH_3$, liquid ammonia, urea, etc.) under the action of catalysts to produce $N_2$ and $H_2$ which are non-toxic and non-polluting. The effects of SCR technology on the control of NOx in flue gas are remarkable.

CN106574536A discloses a method for the removal of hydrocarbons, nitrogen oxides and particulate matter in form of soot, ash, metals and metal compounds being present in process tail gas or exhaust gas from an engine. The method comprises the following steps: providing process tail gas or engine exhaust containing a nitrogen-containing reductant or adding the nitrogen-containing reductant to process tail gas or engine exhaust; passing the process tail gas or exhaust gas at a gas temperature of 225° C. to 550° C. through at least one filter unit, each of which comprising at least one particle filter and capturing the particulate matter; reducing the amount of soot captured in the at least one particle filter and reducing the amount of nitrogen oxides and hydrocarbons in the process tail gas or exhaust gas by a selective catalytic reduction (SCR) with a nitrogen-containing reductant and by an oxidation in contact with at least the first combination of SCR and oxidation catalyst arranged in the particle filter; periodically disconnecting the flow of the process tail gas or the exhaust gas from the at least one filter unit; applying a pneumatic pulse at an outlet of the at least one particle filter by pulse injecting air into the outlet in reverse to the previous flow of the exhaust gas and blowing off the captured particulate matter together with heavy metals and metal compounds from the at least one particulate filter; applying suction at an inlet of the at least one particulate filter; and conveying the particulate matter and heavy metals as well as metal compounds blown off from the at least one particulate filter, optionally through an external auxiliary filter unit, to a container, wherein the at least first combination of SCR and an oxidation catalyst is composed of titanium dioxide and oxides of vanadium and tungsten. The structure and the preparation method of SCR and oxidation catalysts are not described in detail in the above patent.

CN105562077A discloses a method for preparing an SCR catalyst for purifying exhaust pollutant from a diesel engine. According to the catalyst, cordierite honeycomb ceramics are adopted as a carrier material, duct surfaces of the carrier are coated with a catalytic coating which is prepared by using vanadium-cerium-manganese compound oxide as an active ingredient, a silicone-aluminum molecular sieve material is used as an auxiliary, and a tungsten-titanium-silicon compound material is used as a supporting material. Firstly, preparing the supporting material and the active ingredient solution; then, mixing and soaking the active ingredient solution, the auxiliary and the supporting material to obtain catalytic coating powder; thirdly, mixing the coating powder, water and adhesive to obtain slurry; and finally, coating the carrier with the slurry with the coating amount reaches 200-250 g/L. CN105032446A discloses a method for preparing a low temperature type SCR catalyst for purifying nitrogen oxide presented in the exhaust from a diesel engine, wherein cordierite honeycomb ceramic is adopted as a carrier, the surface of the carrier is coated with a catalytic coating, and the catalytic coating comprises the following components in mass ratio: a substrate coating, an active component and a binder with the mass ratio of 8:0.3-0.5:1. The substrate coating comprises the following components: titanium dioxide, tungsten trioxide and silicon dioxide with the content mass ratio of 8-9:0.5-1:0.5-1. The active component comprises the following components: ferric oxide and manganese oxide with the mass ratio of 1.7-3.3:6.7-8.3. The binder is silicon dioxide or aluminum oxide. These patents do not consider the effect of the catalytic coating powder on the catalytic activity. The catalytic coating powders prepared by these methods are obtained with ordinary methods, resulting in a poor dispersion with a serious agglomeration of micro-particles.

Therefore, there is a need to obtain a catalyst powder with a good dispersion for the SCR catalyst obtained in a manner of powder coating.

SUMMARY OF THE DISCLOSURE

In view of this, one objective of the present disclosure is to provide a method for preparing an SCR catalyst, which can obtain powders or coatings of the catalyst with good dispersion by an electric field induction.

Another objective of the present disclosure is to provide an SCR catalyst with uniform morphology and good dispersion of micro-particles.

One further objective of the present disclosure is to provide a use of SCR catalyst in preparing denitrification catalyst for exhaust gas from a vehicle.

The present disclosure achieves the above objectives by the following technical solutions:

In one aspect, the present disclosure provides a method for preparing an SCR catalyst, comprising the steps as following:

(1) placing a first aqueous solution containing titanium oxides and tungstates in an electric field environment, adjusting the pH value of the aqueous solution, and adjusting the current direction, so as to obtain a first mixture;

(2) in the electric field environment, adding dropwise a second aqueous solution containing soluble salt of active components, copper-organic polyamine complexes and dispersants to the first mixture, and adjusting the current direction to obtain a second mixture, wherein the active components are selected from one or more of Ce, Zr, Cu, Fe, Pr and Sc.

(3) processing the second mixture to obtain the SCR catalyst.

According to the preparation method of the present disclosure, preferably in step (1):

adjusting the current direction to direction A when pH<5 in the first aqueous solution;

adjusting the current direction to direction B when pH=5-9 in the first aqueous solution;

adjusting the current direction to direction A when pH=9-10 in the first aqueous solution;

wherein the direction A and the direction B are opposite.

According to the preparation method of the present disclosure, preferably, step (1) is carried out under continuous stirring at a stirring speed of 200-1000 rpm; the pH value of the aqueous solution is adjusted by an alkaline solution with a concentration of 0.5-3 mol/L of alkaline substance.

According to the preparation method of the present disclosure, preferably, in step (1), the weight ratio of titanium oxide to tungstate (measured by the weight of $WO_3$) is 80-98:2-20; the weight ratio of titanium oxide to water is 1:2.5-10; the titanium oxide is titanium dioxide nano-particles; the tungstate is ammonium tungstate, ammonium metatungstate or ammonium paratungstate; and the alkaline material is sodium hydroxide or potassium hydroxide.

According to the preparation method of the present disclosure, preferably, in step (2):

during adding dropwise, the direction of current is adjusted to direction A;

after adding dropwise, the direction of current is adjusted to direction B;

wherein the direction A and the direction B are opposite.

According to the preparation method of the present disclosure, preferably, step (2) is carried out under continuous stirring at a stirring speed of 200-1000 rpm; the second aqueous solution is added dropwise with a speed of 1-10 mL/min.

According to the preparation method of the present disclosure, preferably, the weight ratio of the soluble salt of active components (measured by the weight of the active component oxide) to the titanium oxide is 16-30:100; the soluble salt of active components comprises one or more of cerium gluconate and cerium aminonate; the weight ratio of the soluble salt of active components, the copper-organic polyamine complex and the dispersant is 100-150:8-15:120-200; the dispersant is selected from polyvinyl alcohol or polyacrylic acid.

The preparation method according to the present disclosure, preferably, comprises the steps as following:

(1) placing an aqueous dispersion of titanium dioxide nano-particles, which is used as titanium oxides, in an electric field, and stirring for 0.5-2 h at a stirring speed of 200-600 rpm, then adding tungstate to obtain a first aqueous solution; adding alkaline solution dropwise to the first aqueous solution so as to adjust the pH value of the first aqueous solution, adjusting the current direction to direction A when pH<5 in the first aqueous solution; adjusting the current direction to direction B when pH=5-9 in the first aqueous solution; adjusting the current direction to direction A when pH=9-10 in the first aqueous solution; and then terminating the addition of alkaline solution, stirring for 0.5-1.5 h to obtain a first mixture; wherein the direction A and the direction B are opposite;

(2) in the electric field environment, dispersing the soluble salts of active components, the copper-organic polyamine complexes and dispersants in water to obtain a second aqueous solution; adding the second aqueous solution dropwise into the first mixture at a speed of 1-10 mL/min, and the current direction is direction A during adding dropwise; after adding dropwise, the current direction is direction B, and continually stirring the reaction for 1-2 h; wherein the direction A and the direction B are opposite;

(3) aging the second mixture at an aging temperature of 100-180° C. for 12-48 h, filtrating, washing, freeze-drying for 6-24 h, and then performing calcination for 2-4 h at 500-650° C. under an inert gas protection.

In another aspect, the present disclosure provides an SCR catalyst prepared by the abovementioned method. The SCR catalyst comprises $WO_3$, titanium dioxide nano-particles and active component oxides, wherein the weight ratio of $WO_3$ to titanium dioxide nano-particles is 2-20:80-98, the weight ratio of active component oxides to titanium dioxide nano-particles is 16-30:100, and the catalyst has a uniform dispersion of cubic structures with a particle size of 50-300 nm.

In still another aspect, the present disclosure provides a use of the SCR catalyst in preparing a denitrification catalyst for vehicle exhaust gas.

The SCR catalyst of the present disclosure is prepared in an electric field environment. Powders or coatings of the catalyst with a good dispersion may be obtained by adjusting the current direction at different stages. According to the preferred technical solution of the present disclosure, the micro-particles can be well dispersed and have uniform morphology by controlling the current direction and process parameters. According to the preferred technical solution of the present disclosure, an SCR catalyst with uniform particle morphology and cubic structure can be obtained. The SCR catalyst of the present disclosure is used to prepare a denitrification catalyst for vehicle exhaust gas, which can effectively remove nitrogen oxides from vehicle exhaust gas.

SPECIFIC EMBODIMENTS

Figure 1:
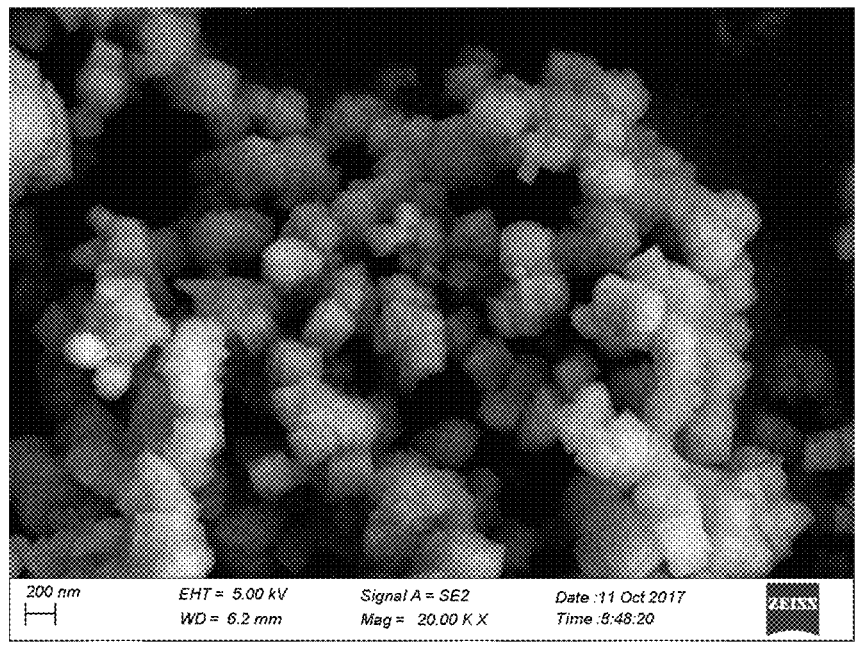
FIG. 1 shows the morphology of SCR catalyst in Example 1.

The present disclosure is further described with the following specific embodiments, but these embodiments have no limits on the protection scope of the present disclosure.

The term "selected" or "selected from" herein refers to selecting an individual component or the combination of two (or more) components. A1-A2: B1-B2:C1-C2 represents the ratio between the three substances A, B and C. A1-A2:B1-B2 represents the ratio between the two substances A and B.

"D50 particle size" refers to the equivalent diameter (average particle size) of the maximum particle when the cumulative distribution is 50% in the distribution curve.

"D90 particle size" refers to the equivalent diameter (average particle size) of the maximum particle when the cumulative distribution is 90% in the distribution curve.

"Specific surface area" refers to the total area of material per unit mass.

The method for preparing an SCR catalyst according to the present disclosure comprises the following steps: (1) step of preparing a first mixture; (2) step of preparing a second mixture; (3) step of processing.

<Step of Preparing a First Mixture>

In step (1) of preparing a first mixture, a first aqueous solution containing titanium oxide and tungstate is placed in an electric field environment, the pH value of the aqueous solution is adjusted, and the current direction is adjusted to obtain a first mixture. There are no special restrictions on the electric field environment, such as using conventional electric field reaction devices.

The current direction is adjusted according to the change of pH value. There are no special restrictions on the method of adjusting the current direction, such as exchanging the positive and the negative electrodes. According to an embodiment of the present disclosure, the current direction is adjusted to direction A, when pH<5 in the first aqueous solution; the current direction is adjusted to direction B, when pH=5-9 in the first aqueous solution; the current direction is adjusted to direction A, when pH=9-10 in the first aqueous solution. The direction A and the direction B are opposite. For example, direction A means from left to right, direction B means from right to left, and vice versa. The inventors surprisingly discover that it is helpful to obtain regular crystal structures in precipitation process by adjusting the current direction under an applied electric field environment.

In order to facilitate uniform mixing and the reaction, step (1) may be carried out under continuous stirring. The means of stirring may be mechanical stirring or magnetic stirring, etc. The magnetic stirring is preferred. The stirring speed may be 200-1000 rpm; preferably, the stirring speed is 300-800 rpm; and more preferably, the stirring speed is 350-450 rpm.

Preferably, the pH value of the aqueous solution is adjusted by the alkaline solution with the alkaline substance concentration of 0.5-3 mol/L; and more preferably, the alkaline solution has an alkaline substance concentration of 0.8-1.5 mol/L. The alkaline substance is preferably sodium hydroxide or potassium hydroxide. Using the above alkaline substances is beneficial to avoiding the decrease of catalyst activity and improving the dispersion uniformity of micro-particles.

The titanium oxides may be titanium dioxide with various sizes, and titanium dioxide nano-particles is preferred. "nano" in the present disclosure has the usual meaning in the field and will not be repeated herein. Titanium dioxide nano-particles have a higher specific surface area, suitable pore structure and water absorption, which is helpful for $WO_3$ loading.

Tungstate may be ammonium tungstate, ammonium metatungstate or ammonium paratungstate; ammonium metatungstate or ammonium paratungstate are preferred; ammonium paratungstate is more preferred. The inventors discover that using ammonium metatungstate or ammonium paratungstate is more advantageous to obtain micro-particles with uniform morphology.

The weight ratio of titanium oxide to tungstate (measured by the weight of $WO_3$) is 80-98:2-20; preferably 84-90:7-18; and more preferably 85-88:11-15. The weight ratio of titanium oxides to water is 1:2.5-10, preferably 1:2.6-6, and more preferably 1:2.8-3.8. It is helpful to obtain micro-particles with uniform morphology by controlling the reactants within the above ranges.

In the present disclosure, step (1) can be: placing an aqueous dispersion of titanium dioxide nano-particles, which is used as titanium oxides, in an electric field, and stirring for 0.5-2 h at a stirring speed of 200-600 rpm; then adding tungstate to obtain a first aqueous solution; adding alkaline solution dropwise to the first aqueous solution so as to adjust the pH value of the first aqueous solution, adjusting the current direction to direction A when pH<5 in the first aqueous solution; adjusting the current direction to direction B when pH=5-9 in the first aqueous solution; adjusting the current direction to direction A when pH=9-10 in the first aqueous solution; and then terminating the addition of alkaline solution, stirring for 0.5-1.5 h to obtain a first mixture; wherein the direction A and the direction B are opposite.

<Step of Preparing a Second Mixture>

In the step (2) of preparing a second mixture, in an electric field environment, a second aqueous solution containing soluble salts of active components, copper-organic polyamine complexes and dispersants are added dropwise into the first mixture, and the current direction is adjusted so as to obtain a second mixture. The active components are selected from one or more of Ce, Zr, Cu, Fe, Pr and Sc, preferably selected from one or more of Ce, Zr and Pr.

During adding dropwise the second aqueous solution, the current direction is adjusted to direction A; after adding dropwise the second aqueous solution, the current direction is direction B. The direction A and the direction B are opposite. The inventors discover that it may contribute to the load of the active components and avoid the agglomeration of precipitates by adjusting the direction of the current in an applied electric field environment, so as to obtaining a uniform dispersion of micro-particles.

In order to facilitate uniform mixing and the reaction, step (2) may be carried out under continuous stirring. The means of stirring may be mechanical stirring or magnetic stirring or the like; preferably magnetic stirring. The stirring speed may be 200-1000 rpm; preferably, the stirring speed is 300-800 rpm; more preferably, the stirring speed is 350-450 rpm. The addition speed of the second aqueous solution may be 1-10 mL/min. Preferably, the second aqueous solution has a dropping speed of 3-8 mL/min. More preferably, the second aqueous solution has a dropping speed of 4-6 mL/min. It is more helpful to obtain micro-particles with uniform morphology by using the above parameters.

The active component is selected from one or more of Ce, Zr, Cu, Fe, Pr, Sc; preferably, the active component is selected from one or more of Ce, Zr, and Pr; more preferably, the active component is the combination of Ce and Zr.

In the SCR catalyst, the active component(s) may be present in the form of an oxide. The weight ratio of the soluble salt of active components (by weight of the active component oxides) to the titanium oxide is 16-30:100; preferably, 18-28:100; more preferably, 21-26:100. It is helpful to improve the catalytic activity of the catalyst and ensure to obtain micro-particles with uniform morphology.

The weight ratio of the soluble salt of active components, the copper-organic polyamine complex and the dispersant is 100-150:8-15:120-200; preferably, 105-135:8-13:130-180; more preferably, 105-120:8-11:135-155. The above weight ratio range of the soluble salt of active components, the copper-organic polyamine complex and the dispersant is helpful to improve the catalytic activity of the catalyst.

The active component oxide may be added in the form of a soluble salt of active components, which is calcined to obtain an active component oxide. The soluble salt of active components comprises one or more selected from cerium gluconate and cerium aminonate; preferably, the soluble salt of active components comprises one or both of cerium gluconate and cerium glutamate. In the present disclosure, cerium gluconate or cerium aminonate has high oxygen storage, oxygen release capacity and strong redox performance, which are helpful to increase the denitration activity of the catalyst and broaden the temperature window of catalytic activity. The soluble salt of active components may also comprise zirconyl nitrate (zirconia dinitrate) and the like. According to one embodiment of the present disclosure, the soluble salt of active components consists of glutamic acid strontium and zirconyl nitrate, or the soluble salt of active components consists of cerium gluconate and zirconyl nitrate. This is advantageous for obtaining a catalyst with uniform morphology.

The complex of copper-organic polyamine according to the present disclosure means a complex of $Cu^{2+}$ and an organic polyamine. Examples of the organic polyamines comprise, but are not limited to, tetraethylenepentamine (TEPA), ethylenediamine tetraacetic acid (EDTA), triethylenetetramine (TRIEN), ethylene glycol bis(iminodiacetic acid) (EGTA), and the like.

The dispersant according to the present disclosure may be selected from polyvinyl alcohol or polyacrylic acid, preferably polyvinyl alcohol. These dispersants play an advantageous role in improving the morphology uniformity of micro-particles in the catalyst.

In the present disclosure, step (2) may be: the soluble salt of active component, the copper ammonia complex and the dispersant are dispersed in water in an electric field environment, so as to obtain a second aqueous solution; and the second aqueous solution is added dropwise into the first mixture with an addition speed of 1-10 mL/min. During adding dropwise, the current direction is adjusted to direction A; after adding dropwise, the current direction is adjusted to direction B, and the reaction is continued with stirring for 1-2 h to obtain a second mixture; wherein the direction A and the direction B are opposite.

<Step of Processing>

In step of processing (3), the second mixture is subjected to processing so as to obtain an SCR catalyst. The processing may comprise the following steps: the second mixture is aged at an aging temperature of 100-180° C. for 12-48 h, filtrated, washed, freeze-dried for 6-24 h, and then calcination is performed at 500-650° C. for 2-4 h under an inert gas protection, so as to obtain an SCR catalyst. The aging temperature is preferred to be 105-150° C., more preferred to be 105-130° C. The aging reaction time is preferred to be 12-24 h; more preferably 12-16 h. The inert gas may be nitrogen or argon, preferably nitrogen. The calcination temperature is preferably 500-600° C.; more preferably 500-550° C. The calcination time is preferably 2.5-3.5 h; more preferably 2.8-3.2 h. Controlling the parameters in the step of processing within the above ranges is advantageous for obtaining micro-particles with uniform morphology and uniform dispersion.

According to one embodiment of the present disclosure, the preparation method of the present disclosure comprises specific steps as following:

(1) placing an aqueous dispersion of titanium dioxide nano-particles, which is used as titanium oxides, in an electric field, and stirring for 0.5-2 h at a stirring speed of 200-600 rpm, then adding tungstate to obtain a first aqueous solution; adding alkaline solution dropwise to the first aqueous solution so as to adjust the pH value of the first aqueous solution, adjusting the current direction to direction A when pH<5 in the first aqueous solution; adjusting the current direction to direction B when pH=5-9 in the first aqueous solution; adjusting the current direction to direction A when pH=9-10 in the first aqueous solution; and then terminating the addition of alkaline solution, stirring for 0.5-1.5 h to obtain a first mixture; wherein the direction A and the direction B are opposite;

(2) in the electric field environment, dispersing soluble salts of active components, the copper-organic polyamine complexes and dispersants in water to obtain a second aqueous solution; adding the second aqueous solution dropwise into the first mixture at a speed of 1-10 mL/min, and the current direction is direction A during the adding dropwise; after adding dropwise, the current direction is direction B, and continually stirring the reaction for 1-2 h to obtain the second mixture; wherein the direction A and the direction B are opposite;

(3) aging the second mixture at an aging temperature of 100-180° C. for 12-48 h, filtrating, washing, freeze-drying for 6-24 h, and then performing calcination for 2-4 h at 500-650° C. under an inert gas protection, so as to obtain the SCR catalyst.

<Catalysts and Applications>

The SCR catalyst obtained by the above preparation method comprises $WO_3$, titanium dioxide nano-particles and active component oxides. The weight ratio of $WO_3$ to titanium dioxide nano-particles is 2-20:80-98, preferably 7-15:84-90, more preferably 11-14:85-88. The weight ratio of active component oxides to titanium dioxide nano-particles is 16-30:100, preferably 18-28:100, more preferably 21-26:100. This is helpful for improving the catalytic activity.

The SCR catalyst according to the present disclosure may be presented in the form of coating or powder. The SCR catalyst according to the present disclosure has a cubic structure which is uniformly dispersed and has a particle diameter of 50-300 nm. That is to say, the micro-particles of the SCR catalyst are uniformly dispersed, and the particle diameter thereof is 50-300 nm, and the shape thereof may be a cubic structure. Preferably, the SCR catalyst of the present disclosure has a cubic structure with a uniform dispersion and a particle diameter of 100-250 nm; more preferably, the SCR catalyst has a cubic structure with a uniform dispersion and a particle diameter of 180-220 nm.

In the present disclosure, the SCR catalyst may have a specific surface area of 130-350 $m^2/g$, preferably 140-250 $m^2/g$, more preferably 155-190 $m^2/g$. The SCR catalyst has an average particle size D50<2.5 μm, D90<9 μm; preferably, D50<2 μm, D90<8 μm; more preferably, D50<1.8 μm, D90<7.5 μm.

The present disclosure also provides a use of the SCR catalyst to prepare a denitration catalyst for vehicle exhaust. The SCR catalyst is formulated into a slurry, which is then coated on the surface of a honeycomb carrier (for example, cordierite), and then dried and calcined to obtain a honeycomb denitration catalyst. Detailed steps can be found in CN105562077A, which is incorporated herein in its entirety by reference. For example, it is carried out with the step (4) and the step (5) of the embodiment 1 in CN105562077A.

<Test Methods>

Particle size test: the particle size of the catalyst was measured by Beckman Coulter LS230 laser particle size analyzer, the USA. The wet dispersion method was performed during the measurement, and the dispersion time was 10 s. Ten sets of data were obtained separately, and the average was calculated.

Specific surface area test: the specific surface area of the catalyst was measured by Mike 2020 HD88 Specific Surface Area Tester, where the degassing temperature was 105° C. and the degassing time was 2 h. The measurements were repeated three times, and the average was calculated.

Morphology test: the morphology of the catalyst was obtained using a German Zeiss Sigma 500 field emission scanning electron microscope. The surface of samples was sprayed with a thin layer of platinum to improve the surface conductivity of samples.

Preparation Example 1: Preparation of Cerium Glutamate 1.335 g of glutamic acid was added into 25 mL of $H_2O$. The mixture was heated to 65° C., and stirred uniformly. 2.67 g of cerium carbonate was added, and the reaction was stirred for 2 h.

Preparation Example 2—Preparation of Cerium Gluconate 1.98 g of glucose and 2.67 g of cerium carbonate were added into 25 mL of $H_2O$. The mixture was heated to 60° C., and the reaction was stirred for 1 h.

Example 1

An SCR catalyst was prepared in an electric field environment by using cerium glutamate as a source of cerium, Cu-TEPA as a copper-organic polyamine complex, and polyvinyl alcohol as a dispersant.

(1) A mixture of 170.47 g of titanium dioxide nanoparticles and 500 mL of water was placed in an electric field reaction apparatus, with magnetically stirring for 1 h at a rotation speed of 400 rpm. 26.79 g of ammonium paratungstate was dissolved in the mixture to obtain a first aqueous solution, maintaining the stirring rate unchanged. NaOH with a concentration of 1 mol/L was added dropwise to the first aqueous solution. When the pH was <5, the current direction was adjusted to from left to right (direction A); when pH=5 to 9, the current direction was adjusted to from right to left (direction B); when pH=9-10, the addition of NaOH solution was terminated, the current direction was adjusted to from left to right (direction A), and the reaction was stirred for 1 hour to obtain a first mixture.

(2) 96 g of cerium glutamate, 10 g of copper-tetraethylene pentamine complex (Cu-TEPA), 13.13 g of zirconyl nitrate and 146 g of polyvinyl alcohol were dispersed in 500 mL of water, and uniformly mixed to obtain a second aqueous solution. The second aqueous solution was added dropwise to the first mixture with an addition speed of 5 mL/min. The magnetic stirring was remained at a constant speed (rotation speed was 400 rpm) and the current direction was adjusted to from left to right (direction A). After the addition, the current direction was adjusted to from right to left (direction B), and magnetic stirring was performed (with rotation speed of 400 rpm) for 2 h to obtain a second mixture.

(3) The second mixture was aged in a hydrothermal reactor for 12 h with the aging temperature of 110° C., filtrated, washed, freeze-dried for 24 h, then calcined at 550° C. for 3 h under $N_2$ atmosphere, and an SCR catalyst A1 was obtained. The morphology of SCR Catalyst A1 was showed in FIG. 1, and physical properties were given in Table 1.

Example 2

An SCR catalyst was prepared in an electric field environment by using cerium gluconate as a source of cerium, Cu-TEPA as a copper-organic polyamine complex, and polyvinyl alcohol as a dispersant.

(1) A mixture of 170.47 g of titanium dioxide nanoparticles and 500 mL of water was placed in an electric field reaction apparatus, with magnetically stirring for 1 h at a rotation speed of 400 rpm. 26.79 g of ammonium paratungstate was dissolved in the mixture to obtain a first aqueous solution, maintaining the stirring rate unchanged. NaOH with a concentration of 1 mol/L was added dropwise to the first aqueous solution. When the pH was <5, the current direction was adjusted to from left to right (direction A); when pH=5 to 9, the current direction was adjusted to from right to left (direction B); when pH=9-10, the addition of NaOH solution was terminated, the current direction was adjusted to from left to right (direction A), and the reaction was stirred for 1 hour to obtain a first mixture.

(2) 113.03 g of cerium gluconate, 10 g of copper-tetraethylene pentamine complex (Cu-TEPA), 13.13 g of zirconyl nitrate and 183 g of polyacrylic acid were dispersed in 500 mL of water, and uniformly mixed to obtain a second aqueous solution. The second aqueous solution was added dropwise to the first mixture with an addition speed of 5 mL/min. The magnetic stirring was remained at a constant speed (rotation speed was 400 rpm) and the current direction was adjusted to from left to right (direction A). After the addition, the current direction was adjusted to from right to left (direction B), and magnetic stirring was performed (with rotation speed of 400 rpm) for 2 h to obtain a second mixture.

Figure 4:
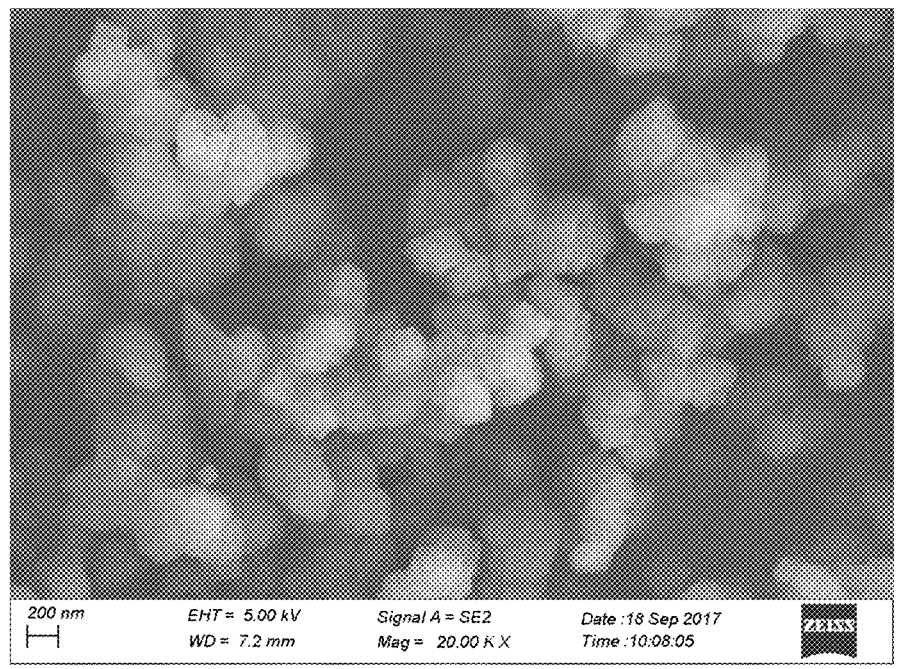
FIG. 4 shows the morphology of SCR catalyst in Example 2.

(3) The second mixture was aged in a hydrothermal reactor for 12 h with the aging temperature of 110° C., filtrated, washed, freeze-dried for 24 h, then calcined at 550° C. for 3 h under $N_2$ atmosphere, and an SCR catalyst A2 was obtained. The morphology of SCR catalyst A2 was showed in FIG. 4, and physical properties were given in Table 1.

Comparative Example 1

The conditions were the same as in Example 1, except that the there was no electric field environment and the adjustment of current direction was not applied during the preparation of the catalyst:

(1) A mixture of 170.47 g of titanium dioxide nanoparticles and 500 mL of water was magnetically stirred for 1 h at a rotation speed of 400 rpm; 26.79 g of ammonium paratungstate was dissolved in the mixture to obtain a first aqueous solution, with the stirring rate unchanged. NaOH with a concentration of 1 mol/L was dropwise added into the first aqueous solution. When the pH was 9-10, the addition of NaOH solution was terminated, and the reaction was stirred for 1 h to obtain a first mixture.

(2) 96 g of cerium glutamate, 10 g of copper-tetraethylene pentamine complex (Cu-TEPA), 13.13 g of zirconyl nitrate and 146 g of polyvinyl alcohol were dispersed in 500 mL of water, and uniformly mixed to obtain a second aqueous solution. The second aqueous solution was added dropwise to the first mixture with an addition speed of 5 mL/min. The magnetic stirring was remained at a constant speed (rotation speed was 400 rpm). After the addition, the reaction was magnetic stirred (with a rotation speed of 400 rpm) for 2 h to obtain a second mixture.

Figure 2:
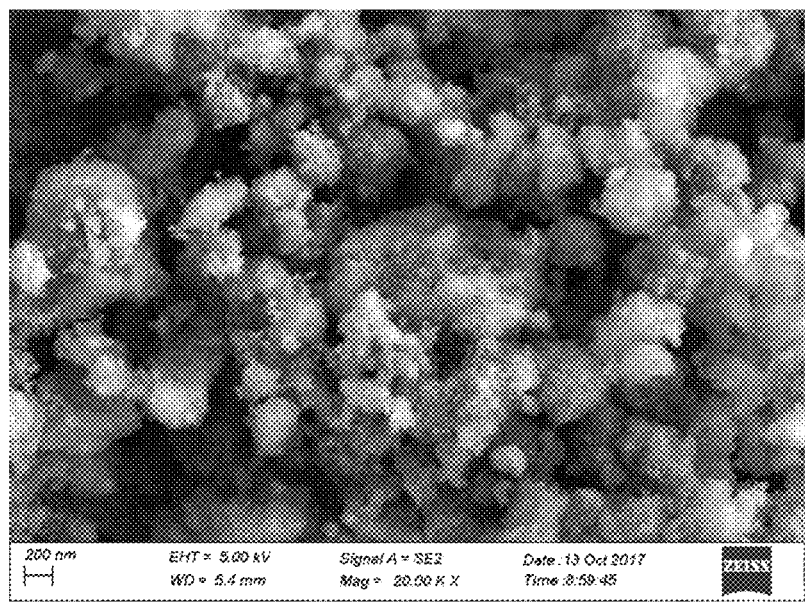
FIG. 2 shows the morphology of SCR catalyst in Comparative Example 1.

(3) The second mixture was aged in a hydrothermal reactor for 12 h with an aging temperature of 110° C., filtrated, washed, freeze-dried for 24 h, then calcined at 550° C. for 3 h under $N_2$ atmosphere, and an SCR catalyst B was obtained. The morphology of SCR catalyst B was showed in FIG. 2, and physical properties were given in Table 1.

Comparative Example 2

The conditions were the same as in Example 1, except that there was no electric field environment and the adjustment of current direction was not applied, cerium glutamate was used instead of cerium nitrate, without addition of complex of copper-organic polyamine and polyvinyl alcohol.

(1) A mixture of 170.47 g of titanium dioxide nanoparticles and 500 mL of water was magnetically stirred for 1 h at a rotation speed of 400 rpm; 26.79 g of ammonium paratungstate was dissolved in the mixture to obtain a first aqueous solution, with the stirring rate unchanged. NaOH with a concentration of 1 mol/L was dropwise added into the first aqueous solution. When the pH was 9-10, the addition of NaOH solution was terminated, and the reaction was stirred for 1 hour to obtain a first mixture.

(2) 96 g of cerium nitrate and 13.13 g of zirconyl nitrate were dispersed in 500 mL of water, and uniformly mixed to obtain a second aqueous solution. The second aqueous solution was added dropwise to the first mixture with an addition speed of 5 mL/min. The magnetic stirring was remained at a constant speed (rotation speed was 400 rpm). After the addition, the reaction was magnetic stirred (with a rotation speed of 400 rpm) for 2 h, and a second mixture was obtained.

Figure 3:
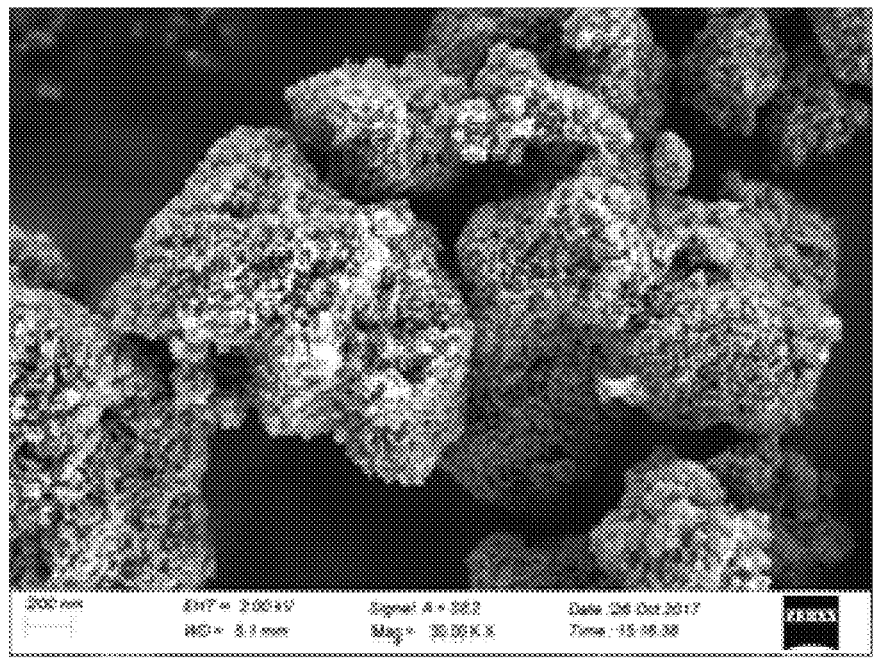
FIG. 3 shows the morphology of SCR catalyst in Comparative Example 2.

(3) The second mixture was aged in a hydrothermal reactor for 12 h with an aging temperature of 110° C., filtrated, washed, freeze-dried for 24 h, then calcined at 550° C. for 3 h under $N_2$ atmosphere, and an SCR catalyst C was obtained. The morphology of SCR catalyst C was showed in FIG. 3, and physical properties were given in Table 1.

TABLE 1

Physical properties of SCR catalysts

| No. | Particle Size, μm | | Specific surface area, $m^2/g$ | Morphology |
|---|---|---|---|---|
| | D50 | D90 | | |
| Example 1 | 1.6 | 7.3 | 175.4 | Uniform morphology, good dispersion, a cubic structure with a particle size of about 200 nm. |
| Example 2 | 1.3 | 6.8 | 163.5 | Uniform morphology, good dispersion, a cubic structure with a particle size of about 200 nm. |
| Comparative Example 1 | 4.7 | 15.3 | 103.4 | Uneven morphology, bad dispersion, a cubic structure was not completely formed. |
| Comparative Example 2 | 15.1 | 62.4 | 53.4 | Severe agglomeration without cubic structure. |

In Example 1 and Example 2, the current directions were adjusted during the preparation process, cerium glutamate or cerium gluconate was used as a cerium source, and a complex of copper-organic polyamine and polyvinyl alcohol (or polyacrylic acid) was used. As can be seen from the table, the catalysts prepared in Example 1 and Example 2 have a small particle size, a large specific surface area, and a cubic structure with a uniform morphology. In Comparative Example 1, there is no adjustment of the current direction, the catalyst obtained has uneven morphology, bad dispersion, and a cubic structure was not completely formed. In Comparative Example 2, there is no adjustment of the current direction, while cerium glutamate was replaced by cerium nitrate, and there was no addition of a copper-organic polyamine complex and polyvinyl alcohol, the catalyst obtained was agglomerated severely, and there was no cubic structure formed.

The present invention is not limited to the above-described embodiments. Any variations, modifications, and alterations that may be conceived by those skilled in the art are intended to fall within the scope of the present disclosure without departing from the spirit of the invention.

What is claimed is:

1. A method for preparing an SCR catalyst, the method comprising:

(1) placing a first aqueous solution containing a titanium oxide and a tungstate in an electric field, adjusting the pH value of the first aqueous solution, and adjusting a current direction of the electric field to obtain a first mixture;

(2) adding dropwise a second aqueous solution containing a soluble salt of one or more active components, a copper-organic polyamine complex and a dispersant to the first mixture, and adjusting the current direction to obtain a second mixture, wherein the one or more active components are selected from a group consisting of Ce, Zr, Cu, Fe, Pr and Sc; and (3) processing the second mixture to obtain the SCR catalyst, wherein processing the second mixture comprises one or more of aging, filtering, washing, drying, or calcining;

wherein step (1) comprises:
   adjusting the current direction to a direction A when the pH value of the first aqueous solution is <5;
   adjusting the current direction to a direction B when the pH value of the first aqueous solution ranges from 5-9; and
   adjusting the current direction to the direction A when the pH value of the first aqueous solution ranges from 9-10,
   wherein the direction A and the direction B are opposite wherein in step (2):
   during the dropwise addition, the direction of current is adjusted to the direction A; and
   after the dropwise addition, the direction of current is adjusted to the direction B.

2. The method according to claim 1, wherein step (1) is carried out under continuous stirring at a stirring speed of 200-1000 rpm; and the pH value of the aqueous solution is adjusted by adding an alkaline solution that contains an alkaline substance in a concentration of 0.5-3 mol/L.

3. The method according to claim 2, wherein in step (1), the weight ratio of the titanium oxide to the tungstate, where the tungstate is measured by the weight of $WO_3$ equivalents, is 80-98:2-20; the weight ratio of titanium oxide to water is 1:2.5-10; the titanium oxide is titanium dioxide nano-particles; the tungstate is ammonium tungstate, ammonium metatungstate or ammonium paratungstate; and the alkaline substance is sodium hydroxide or potassium hydroxide.

4. The method according to claim 1, wherein step (2) is carried out under continuous stirring at a stirring speed of 200-1000 rpm; and the second aqueous solution is added dropwise with a speed of 1-10 mL/min.

5. The method according to claim 1, wherein the weight ratio of the soluble salt of the one or more active components (as measured by the weight of the active component oxide) to the titanium oxide is 16-30:100;
   the soluble salt of the one or more active components comprises one or more of cerium gluconate and cerium aminonate;
   the weight ratio of the soluble salt of the one or more active components, the complex of copper-organic polyamine and the dispersant is 100-150:8-15:120-200; and
   the dispersant is selected from polyvinyl alcohol or polyacrylic acid.

6. The method according to claim 1, wherein:

step (1) further comprises:
- stirring an aqueous dispersion of the titanium oxide in the electric field for 0.5-2h at a stirring speed of 200-600 rpm, then adding the tungstate to obtain the first aqueous solution;
- adding an alkaline solution dropwise to the first aqueous solution to adjust the pH value of the first aqueous solution; and
- after the adjusting the current direction of the electric field to the direction A when the pH value is <5, to the direction B when the pH value is 5-9, and to the direction A when the pH value is 9-10, terminating the addition of the alkaline solution and stirring for 0.5-1.5h to obtain the first mixture;

step (2) further comprises:
- dispersing the soluble salts of the one or more active components, the copper-organic polyamine complexes and the dispersants in water to obtain the second aqueous solution;
- performing the dropwise addition of the second aqueous solution into the first mixture at a speed of 1-10 mL/min; and
- the adjusting the current direction of the electric field environment to the direction A during the dropwise addition, adjusting the current direction to the direction B after the dropwise addition, and continually stirring for 1-2h to obtain the second mixture; and step (3) further comprises aging the second mixture at an aging temperature of 100-180° C. for 12-48h, filtrating, washing, and freeze-drying the aged second mixture for 6-24h, and then performing calcination for 2-4h at 500-650° C. under an inert gas protection to obtain the SCR catalyst, wherein the titanium oxide is titanium dioxide nanoparticles and the direction A and the direction B are opposite.

7. An SCR catalyst prepared by the method according to claim 1, wherein the SCR catalyst comprises $WO_3$, titanium dioxide nano-particles and oxides of the one or more active components, wherein the weight ratio of $WO_3$ to titanium dioxide nano-particles is 2-20:80-98, the weight ratio of active component oxides to titanium dioxide nano-particles is 16-30:100, and the SCR catalyst has a cubic structure with a uniform dispersion and a particle size of 50-300 nm.

8. A denitrification catalyst for a vehicle exhaust, wherein the denitrification catalyst comprises the SCR catalyst according to claim 7.

* * * * *